Feb. 26, 1957  G. A. SCHEIDT  2,783,025
CABLE GUIDING APPARATUS
Filed Nov. 8, 1954
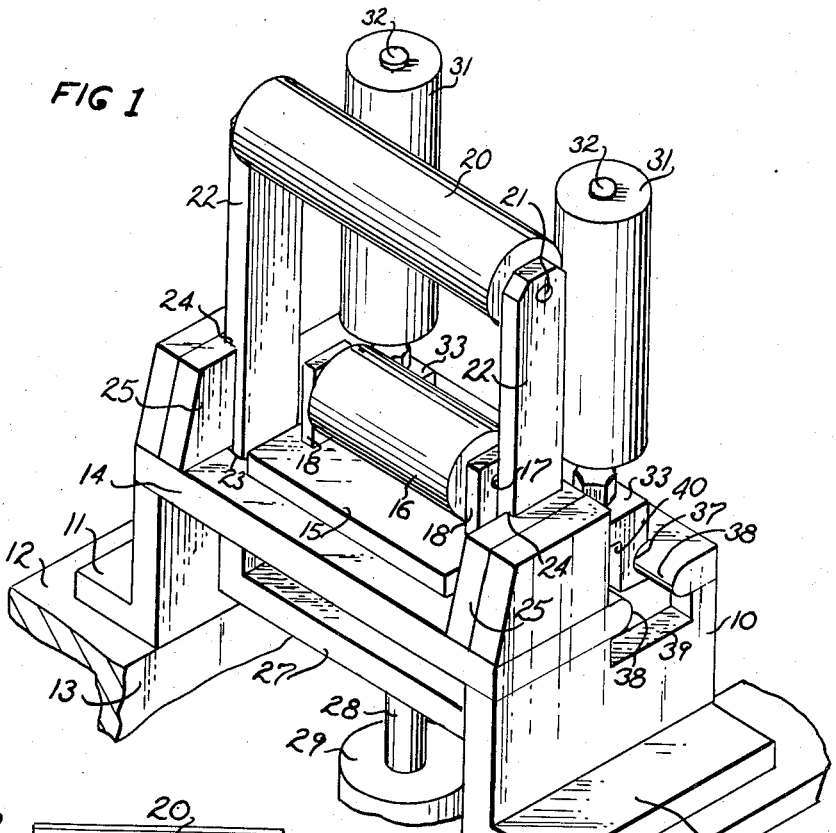
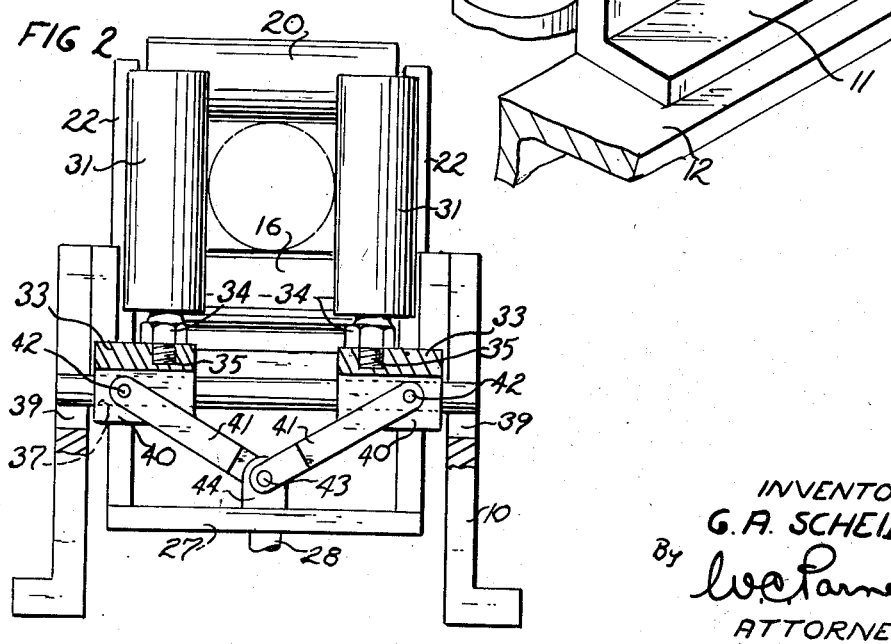
INVENTOR
G. A. SCHEIDT
By W. C. Parnell
ATTORNEY

2,783,025
Patented Feb. 26, 1957

2,783,025

CABLE GUIDING APPARATUS

Gerald A. Scheidt, Buffalo, N. Y., assignor to Western Electric Company, Incorporated, New York, N. Y., a corporation of New York Application November 8, 1954, Serial No. 467,374

4 Claims. (Cl. 254—190)

This invention relates to cable guiding apparatus particularly apparatus for guiding cables of various sizes tangent to a given plane.

Cables of various sizes are measured while passing between roller units of a measuring apparatus, the lower unit of which is at a fixed position requiring the cables of various sizes to travel with their lower surfaces in a given plane.

To produce accurate measurements from an apparatus of this type, which is the subject matter of applicant's co-pending application, Serial No. 467,445, filed November 8, 1954, now Patent No. 2,739,387, it is important that suitable guiding means be provided to control the positions of the cable portions entering and leaving the measuring apparatus and to assure also positioning of the bottom surface of each cable, regardless of its size, tangent to the plane of the lower unit of the measuring apparatus.

The object of the present invention is a cable guiding apparatus which is simple in structure, readily actuable and highly accurate in guiding cables of various sizes.

With this and other objects in view, the invention comprises an apparatus for guiding cables including a fixed position bottom roller, a movable top roller and parallel side rollers operatively connected for movement simultaneously with the top roller relative to the bottom roller to produce between the rollers, passageways of various sizes for firmly guiding cables of different sizes singly.

In the present embodiment of the invention, the top roller is supported by a frame mounted to slide vertically and actuated into open or guiding positions by a manually controlled air cylinder. The side rollers are supported by slides connected through links to the frame supporting the top roller so that through the action of the frame to move the top roller predetermined distances relative to the bottom roller the operative connection of the links to the slides will cause the side rollers to move like distances toward and away from each other to maintain a perfectly square path through which the round cables of various sizes may travel.

Other objects and advantages will be apparent from the following detailed description when considered in conjunction with the accompanying drawing, wherein:

Fig. 1 is an isometric view of the apparatus, and

Fig. 2 is a rear elevational view of the apparatus, portions thereof being shown in section.

Although the apparatus was designed to be used in like pairs, one at each end of a measuring apparatus, only one has been shown and described herein. The apparatus includes a main frame 10, the horizontal feet 11 of which are mounted on suitable supports 12 while the central structure of the frame and apparatus straddles an opening 13. The frame 10 includes a horizontal portion 14 having a support 15 for a bottom roller 16 mounted thereon. The bottom roller 16 is rotatably supported on a spindle 17 through the aid of suitable bearings (not shown) the ends of the spindle 17 being mounted in vertical members 18 of the support 15. The mounting of the bottom roller 16 is of great importance in that its upper surface must lie adjacent a tangential horizontal plane determining the definite location of all cables travelling through the apparatus regardless of their sizes.

A top roller 20 is rotatably mounted on a spindle 21 through the aid of suitable bearings (not shown) the ends of the spindle 21 being mounted in the upper ends of a U-shaped movable support or frame 22. The vertical portions of the movable frame 22 extend through apertures 23 of the horizontal portion 14 of the main frame 10 and are guided by grooves 24 in vertical portions 25 of the main frame. The central or connecting portion 27 of the movable frame 22 is connected to a piston rod 28 of an air cylinder 29 in any suitable manner (not shown). The air cylinder 29 is supplied with air under pressure alternately above and below the piston through the aid of a conventional electrically or manually operable valve to move the frame 22 upwardly to open the apparatus and to move the frame downwardly to close the apparatus on a cable regardless of its size.

Side rollers 31 rotatably mounted on vertical spindles 32 through the aid of suitable bearings (not shown) are supported for movement on slides 33. In the present embodiment of the invention the lower portions 34 of the spindles 32 are in the form of hexagonal bolts with threaded portions 35 mounted in threaded apertures of the slides. The slides 33 have parallel concaved grooves 37 in the sides thereof to receive parallel convexed guides 38. The guides 38 are supported by the main frame 10 and extending across the central opening 13 with their ends terminating in open portions 39 of the vertical sides of the main frame. Longitudinal notches or grooves 40 extend through the slides 33 to receive the outer ends of their respective links 41. The outer ends of the links 41 are pivotally connected at 42 to their respective slides 33 while the inner ends are pivotally connected at 43 to a bracket 44 which is fixedly mounted on the central portion 27 of the frame 22.

Considering now the operation of the apparatus, let it be assumed that the apparatus is in its open position with the central portion 27 of the frame held against the undersurface of the horizontal portion 14 of the main frame 10 through the action of the air cylinder 29 moving the piston and its rod 28 upwardly. At this time, the top roller 20 and the side rollers 31 will be at their open positions farthest from the cable engaging portion of the bottom roller 16. While in this position the leading end of a cable of any size may be threaded through the apparatus after which the valve for controlling the air cylinder 29 is actuated to move the piston with its rod 28 downwardly, moving the frame 22 and the top roller 20 downwardly until the top roller engages the topmost surface of the cable. The operative connection of the slides 33 with the movable frame 22, and thus with the piston rod 28, assures simultaneous movement of the side rollers 31 toward each other to engage the sides of the cable and move it laterally if need be to centrally locate the cable regardless of its size with respect to the top and bottom rollers. This connection between the side rollers and the top roller produces a path which is square in cross-section, the outer planes of which are formed by the innermost lines of the peripheries of the rollers to lie tangent to the four equally spaced portions of the cables of various sizes to permit free movement of the cable through the apparatus without applying undue drag or tension thereon but to assure positive location of all portions of the cable leaving the apparatus.

After each cable has passed through the apparatus, the apparatus is moved into open position assuring sufficient space for feeding the leading end of the next cable, regardless of its size, through the apparatus. Furthermore, the actuation of the single power or operating means through its connection with the top and side rollers assures uniform closing of the rollers about the cable under like pressures to form an accurate guiding path therefor regardless of the size of the cable and regardless of any irregularity which might occur in the formation of the cable to centrally position the cable with respect to the given path in which it is to travel and to always assure positioning of all portions of the cable so that their bottom surfaces will lie tangent to a given plane. Furthermore, by positioning the two apparatus, one at the entrance end of a measuring unit and one at the exit end thereof, each cable will be caused to travel in a straight line through the measuring unit. Any bend appearing in the cable prior to reaching the first apparatus would be removed due to the holding force of the rollers in each apparatus preventing movement of the cable out of a straight line path.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for guiding cables comprising, a fixed position bottom roller mounted for rotation on a horizontal axis to support cables of various sizes singly and position their undersurfaces in a given plane, a top roller parallel with the bottom roller and supported for movement relative thereto, parallel side rollers supported for movement relative to each other and the bottom roller, and means operatively connecting the top and side rollers to cause movement thereof relative to each other and the bottom roller simultaneously to produce therebetween passageways of various sizes for firmly guiding the cables of different sizes singly.

2. An apparatus for guiding cables comprising, a fixed position bottom roller mounted for rotation on a horizontal axis to support cables of various sizes singly and position their undersurfaces in a given plane, a top roller disposed parallel with the bottom roller, a movable frame to support the top roller, means to move the frame to move the top roller relative to the bottom roller, parallel side rollers supported for movement relative to each other and the bottom roller, and means operatively connected to the frame to move the side rollers like distances relative to each other and the other rollers during movement of the frame to move the top roller relative to the fixed position bottom roller to produce therebetween passageways of various sizes for cables of various sizes singly.

3. An apparatus for guiding cables comprising a fixed position bottom roller mounted for rotation on a horizontal axis to support cables of various sizes singly and position their undersurfaces in a given plane, a top roller disposed parallel with the bottom roller, a movable frame to support the top roller, means to move the frame to move the top roller relative to the bottom roller, parallel side rollers disposed adjacent the top and bottom rollers, supports for the side rollers mounted for movement in a given plane, and means operatively connecting the frame and the supports to move them with their top and side rollers simultaneously like distances relative to each other and the fixed position bottom roller to produce passageways of various sizes therebetween supported on said plane for cables of various sizes singly.

4. An apparatus for guiding cables comprising a fixed position bottom roller mounted for rotation on a horizontal axis to support cables of various sizes singly and position their undersurfaces in a given plane, a top roller disposed parallel with the bottom roller, a movable frame to support the top roller, means to move the frame to move the top roller relative to the bottom roller, parallel side rollers disposed adjacent the top and bottom rollers, slides to support their respective side rollers mounted for movement in a plane parallel with the bottom and top rollers, and links operatively connecting the slides to the frame whereby movement of the frame to move the top roller given distances relative to the bottom roller will move the slides with their side rollers like distances relative to each other and the other rollers to form cable guides of various sizes singly extending upwardly from said plane.

References Cited in the file of this patent
UNITED STATES PATENTS

| | | |
|---|---|---|
| 2,260,011 | Diftmeyer | Oct. 21, 1941 |
| 2,441,439 | Nelson | May 11, 1948 |
| 2,467,643 | Wirth | Apr. 19, 1949 |
| 2,657,879 | Pike | Nov. 3, 1953 |